United States Patent [19]

Roullard, III et al.

[11] Patent Number: 4,569,053
[45] Date of Patent: Feb. 4, 1986

[54] LASER TUNER ASSEMBLY

[75] Inventors: Fred P. Roullard, III, Thousand Oaks, Calif.; Douglas L. Zander, Ocoee, Fla.; Robert W. Bromiley, Somerville, N.J.

[73] Assignee: Allied Corporation, Morris Township, Morris County, N.J.

[21] Appl. No.: 444,132

[22] Filed: Nov. 23, 1982

[51] Int. Cl.⁴ ............................................... H01S 3/10
[52] U.S. Cl. ...................................... 372/20; 372/105; 372/103
[58] Field of Search ........................... 372/20, 19, 105; 373/103, 101

[56] References Cited

U.S. PATENT DOCUMENTS 3,868,592  2/1975  Yarbourough et al. ............. 372/105

OTHER PUBLICATIONS

G. Holtom et al., "Design of a Birefringent Filter for High-Power Dye Lasers", 1974, pp. 577-579, IEEE J. Quantum Electron.
C. R. Pollock et al., "Computer Controlled cw Laser Spectrometer" 1979, pp. 1907-1912, Applied Optics, vol. 18, No. 12.
H. Daneshvar-Hosseini et al., "A Microprocessor-Controlled Laser Grating System for Laser Tuning", pp. 137-142, Optics and Laser Technology, 1982, Note: Advertisement for Coherent CR-699-29/Autoscan TM System.
Preuss et al., "Three-Stage Birefringent Filter Tuning Smoothly over the Visible Region"; Appl. Optics, vol. 19, No. 5, pp. 702-709; Mar. 1980.

Primary Examiner—William L. Sikes
Assistant Examiner—Léon Scott, Jr.
Attorney, Agent, or Firm—James Riesenfeld; Gerhard H. Fuchs

[57] ABSTRACT

An improved laser tuner assembly of the type that includes a plurality of parallel, spaced-apart, birefringent plates comprises means for independently adjusting the orientations of the individual plates, clamping means for demountably securing the positions of the individual plates without substantially altering their orientations, and means for rotating the plates as a unit to tune the laser. The tuner permits simple and reproducible orientation of the plates. In a preferred embodiment, tuning is electronically controlled and motor driven.

3 Claims, 7 Drawing Figures

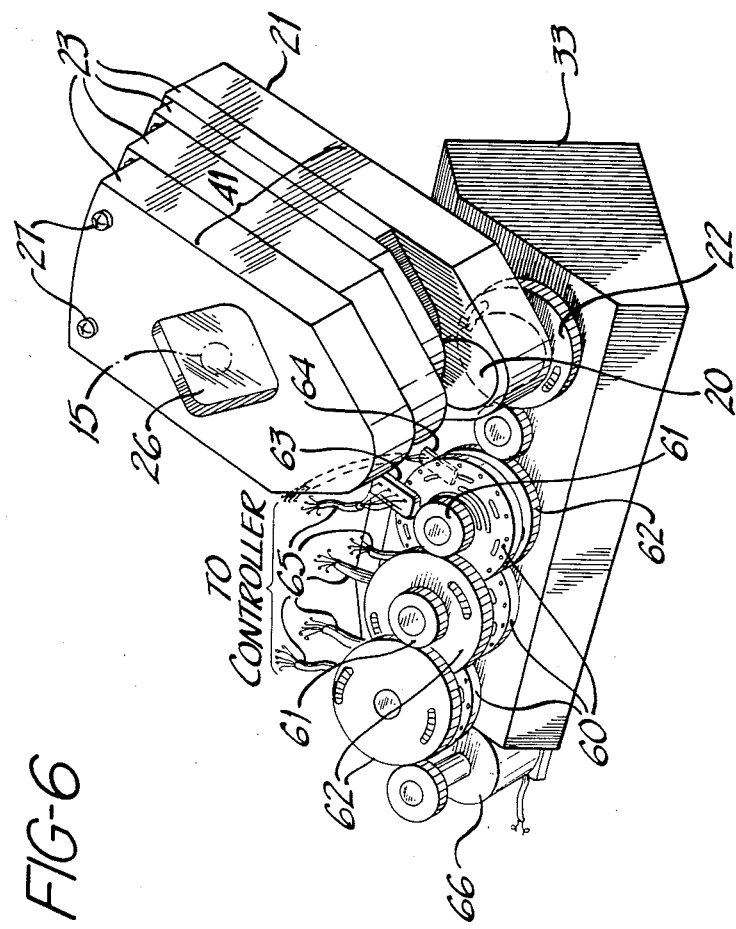

LASER TUNER ASSEMBLY

BACKGROUND OF THE INVENTION

1. Field of the Invention

This invention relates to a tuning apparatus for a laser and, more particularly, to an assembly for a birefringent filter tuner.

2. Description of the Prior Art

Many types of lasers can be tuned over a small wavelength range; however, only a few types are tunable over a broad enough range to be considered truly "tunable." The most common type of tunable laser is the dye laser, in which the laser medium is a solution of an organic dye. In recent years, several tunable solid state lasers have been disclosed; most notably, the alexandrite laser (U.S. Pat. No. 4,272,733).

Tuning of tunable lasers may be accomplished in several different ways. In general, tuning is accomplished by including within the optical resonator an optical element with wavelength-selective properties, so that only light having a certain (selectable) wavelength is favored for amplification by the active medium. For example, the optical element may be a prism, a lens having longitudinal chromatic aberration, or an optical grating. A preferred tuner consists of one or more birefringent filters.

The theory, design, and operation of birefringent filter tuners have been described by G. Holtom et al., IEEE, J. Quantum Electron. QE-10, 577 (1974); J. M. Yarborough et al., U.S. Pat. No. 3,868,592, issued Feb. 25, 1975; and D. R. Preuss et al., Appl. Opt. 19, 702 (1980). In practice, one or more birefringent crystal plates are placed in the laser cavity at Brewster's angle to the direction of the laser beam. A single plate acts as a wavelength selector, with tuning accomplished by rotating the plate about an axis normal to its surface. By adding additional plates, the output beam wavelength peak can be narrowed. The thickness of each plate in a tuner is an integral multiple of the thickness of the thinnest plate. The plates are maintained in a parallel array, which is rotated as a unit for tuning. Optimum performance of the tuner requires that the optic axes of all the plates be precisely aligned. Although apparatus for birefringent tuners and methods for orienting their multiple plates have been disclosed in the references cited above, none describes a tuner assembly that permits convenient plate orientation, ensures that the orientation is not disturbed when the plates are clamped into place, and readily permits the clamping operation to be reversed.

SUMMARY OF THE INVENTION

In accordance with the present invention, we provide an improved laser tuning apparatus including a plurality of parallel, spaced-apart, birefringent plates rotatably mounted within the optical cavity of a tunable laser. The improvement comprises means for independently adjusting the orientations of the individual plates, clamping means for demountably securing the positions of the individual plates without substantially altering their orientations, and means for rotating the plurality of plates as a unit to tune the laser. By using the apparatus of the present invention, the plates of a birefringent tuner can be oriented without much difficulty. The basic tuning assembly can readily be incorporated into a system for automatic control of laser tuning.

BRIEF DESCRIPTION OF THE DRAWINGS

FIG. 6 is an isometric view of an electronically controlled, motor driven tuner of the present invention.

DETAILED DESCRIPTION OF THE INVENTION

A birefringent filter, one of a number of apparatuses suitable for varying the wavelength of a tunable laser, has several advantages over alternative apparatuses. Among the advantages are "low loss, high dispersion in a small physical size, resistance to damage at high intensity, and the absence of any surfaces normal to the laser beam." (Holtom et al., loc. cit.).

In operation, the plates of a birefringent filter tuner are placed in a tunable laser cavity at Brewster's angle to the beam direction. By suitable choice of the number, thickness, and orientation of the plates, smooth continuous tuning can be accomplished with little or no power loss at the peak of the laser gain curve. The optimum number and thickness of birefringent plates in a tuner may be determined by methods well known in the art (see e.g., Preuss, et al. op. cit.) and are fixed at the design stage.

The birefringent plates may be fabricated from a variety of crystalline materials having low optical absorption and high optical damage resistance, such as sapphire, calcite, and chrysoberyl. However, for optimum performance, the plates are typically fabricated from crystalline quartz having its optic axis in the plane of the plate. Plate thicknesses are chosen to be integral multiples of the thinnest plate. Surface quality and flatness as well as thickness uniformity are important for best performance.

Figure 1:
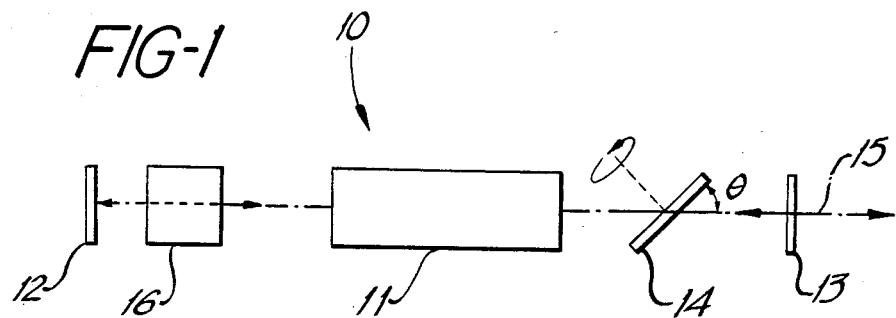
FIG. 1 is a schematic view of the optical cavity of a tunable laser.

The process by which the birefringent plates are initially oriented and then maintained in the proper orientation is discussed in detail by Preuss et al., ibid., and may be understood by reference to FIG. 1. A laser cavity 10 comprises a laser medium 11, reflectors 12 and 13, and a birefringent filter tuner 14. The laser beam 15 makes with the plane surface of the filter an angle $\theta$, generally chosen to be Brewster's angle. If the filter consists of more than one plate, the plates are parallel and the beam makes an angle $\theta$ with the surface of each. For tuning, the filter is rotated about an axis normal to the plate. If an optional electro-optic Q-switch 16 is present, then optimal tuning (of a solid state laser) is achieved with a multi-plate tuner when the thinnest plate is closest to the Q-switch and the thickest is furthest away.

Figure 2:
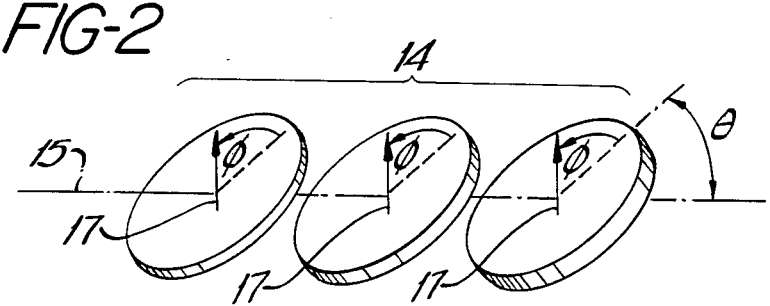
FIG. 2 is a schematic view of a 3-element birefringent filter tuner.

FIG. 2 shows a schematic view of a 3-plate filter. The beam makes an angle $\theta$ with the plane of each plate. The optic axis 17 of each plate is in the plane of the plate and all three axes are coplanar; they remain so as the plates are rotated as a unit through an angle $\phi$ for the purpose of tuning to a particular wavelength. The optic axes of the plates must be very precisely aligned, generally to within about five minutes of arc, to permit smooth continuous tuning. The procedure by which the alignment of the optic axes is accomplished is described generally in Preuss et al., pp. 707 ff, and that description is incorporated herein by reference. However, the present assembly provides several advantages over that described by Preuss et al. These advantages are apparent when their apparatus, depicted in FIG. 3, is compared with the present apparatus shown in FIG. 4.

Figure 3:
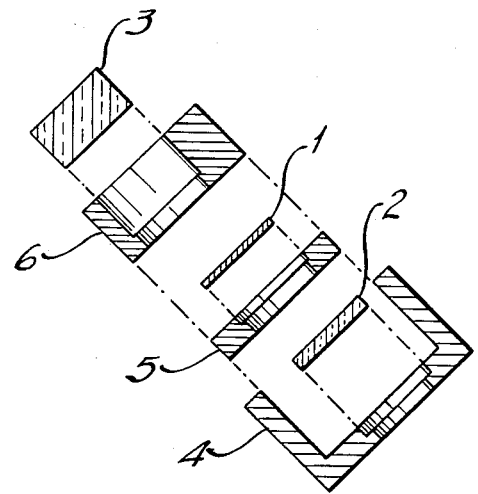
FIG. 3 is an exploded view of a birefringent filter tuner of the prior art.

FIG. 3 shows the elements of the prior art filter design of Preuss et al. in an exploded view. The filter includes three quartz plates 1, 2, and 3, having thickness in the ratio 1:2:15. In the alignment procedure, plate 2 is first glued into filter body 4, while plates 1 and 3 are glued into plate holders 5 and 6, respectively. After aligning the optic axes of the three plates, holders 5 and 6 are glued into filter body 4. Gluing the holders into the filter body is disadvantageous, because the tuner can then not be taken apart for cleaning, for readjustment, or for removing and replacing tuner elements.

Figure 4:
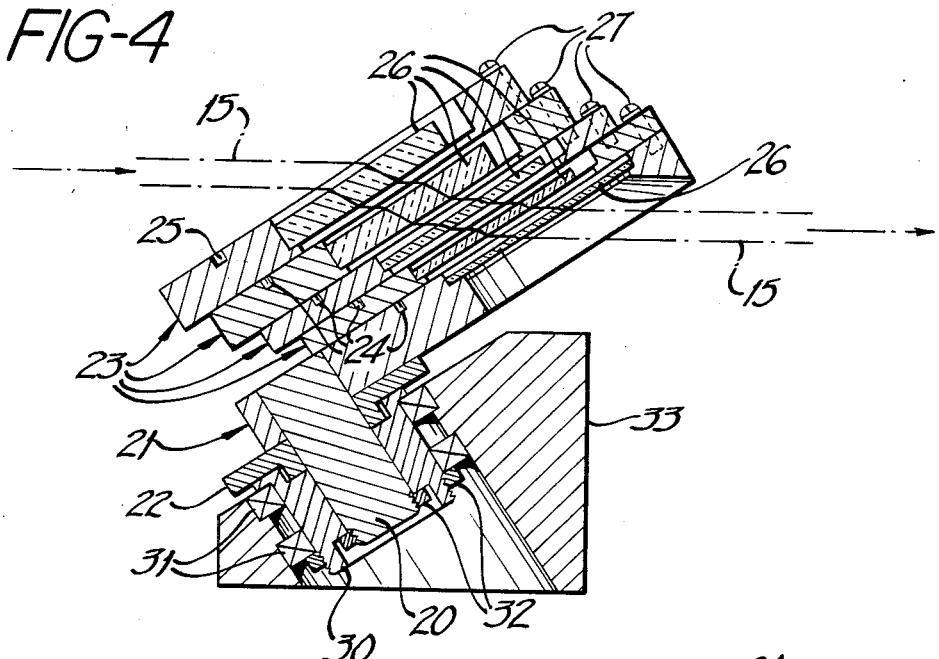
FIG. 4 is a longitudinal section of a tuner of the present invention.
Figure 4A:
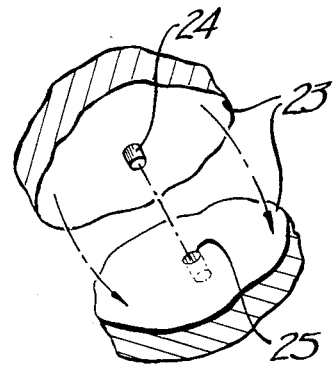
FIG. 4A is an exploded view of a means for fitting together adjoining plate holders of a tuner.

FIG. 4 shows the tuner of the present invention. The pivot pin 20 is connected to pivot hub 30, which in turn is connected to the inside diameter surface of bearings 31. Bearing retaining nuts 32 serve to hold the above items together and to preload the bearings. The outside diameters of the bearings are press-fit into mount base 33. Each plate 26 is mounted into a plate holder, for example with an adhesive. The bottom plate holder 21 and optional anti-backlash gear 22 are fixed to pivot pin 20. Each successive plate holder 23 is first placed onto the assembly by fitting the pin 24 of a plate holder into a receiving hole 25 in the previously installed plate holder. An exploded view of this pin-in-hole arrangement is shown in FIG. 4A. The arrangement facilitates adding/removing plate holders to/from the tuner, including holders for plates of various thicknesses. After each plate 26 has been properly oriented, a clamping screw 27 clamps the newly installed plate holder to the previously installed plate holder. The resulting "staggered" arrangement of plates takes into account the offset of beam 15 from plate to plate.

Figure 5:
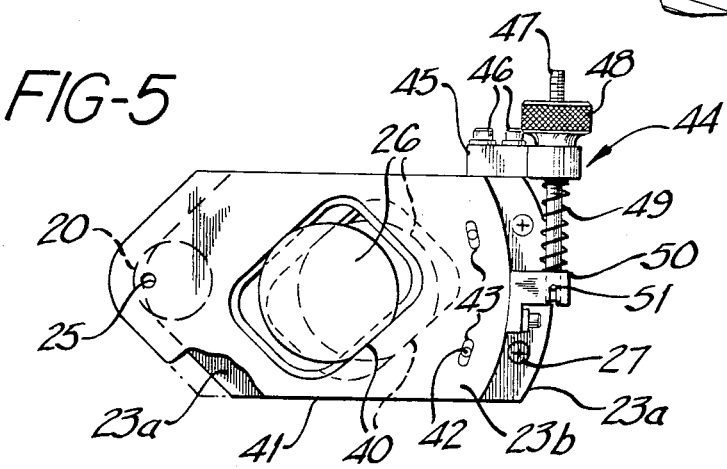
FIG. 5 is a plan view of a tuner of the present invention.

FIG. 5 depicts a screw-adjustable apparatus that is used to align the optic axis of a plate with the optic axis (or axes) of a previously installed plate (or plates). Circular plate 26 has a flat surface 40 along its edge to indicate the direction of its optic axis and to facilitate approximate orientation of the axis with plane edge 41 of the plate holder. The plane edges make it clear to the naked eye when a plate is mistakenly adjusted to a rotationally nearby, unwanted transmission pass band. Tapped holes 42 in the previously installed plate 23a are visible at the bottom of slots 43 in the top plate 23b. Clamping screws 27 fix previously installed plates to the next previously installed plates (not shown). After plate 26 has been properly adjusted, clamping screws will be installed in threaded holes 42.

The plate adjustment is accomplished by means of a removable screw drive mechanism 44. A bracket 45 is held by two screws 46 to the previously installed plate holder. A partially threaded shaft 47 passes through a clearance hole in the bracket. A knurled knob 48 is threaded onto the shaft. A compressed spring 49 pushing against a second bracket 50 provides tension on the shaft. A pin 51 in the shaft holds the unthreaded end of the shaft inside the second bracket. When knurled knob 48 is rotated, shaft 47 passes into or out of bracket 45 causing top plate holder 23b to rotate, thus adjusting the orientation of the plate 26. Clamping screws in the threaded holes 42 fix the position of the top plate, after which screw drive mechanism 44 may be removed. This screw-driven alignment method permits reproducible orientation of the plates, which is not readily accomplished with the apparatus of the prior art.

FIG. 6 shows an embodiment of the present invention in which a tuner of the present invention is electronically controlled and motor driven. As depicted there, rectangular plates have been oriented and fixed into position with clamping screws 27, as discussed above. Tuning of laser beam 15 is accomplished by rotating the plates and holders as a unit about pivot pin 20. An anti-backlash gear 22 is fixed to pivot pin 20. Encoder wheels 60 and reducing gears 61 are attached to the shafts of each of the other three anti-backlash gears 62. Each encoder wheel has a row of light emitting diodes 63 above it and a row of photo detectors 64 below it to sense the rotational position of the tuner. The photo detectors may be photo-cells, photo-diodes, photo-transistors, photoresistors, or any light-sensitive electronic device. The cable harnesses 65 for the light emitting diodes and the photo-detectors are connected to the control electronics (not shown) of the laser system. A motor 66 can be energized by the control electronics to move the gear train and thus the tuner in either the clockwise or the counter-clockwise direction to a preset position. Since the gear train reduces the rotational movement of each stage, each of the encoder wheels measures a different magnitude of rotation. The result of the several stages of encoding is a high precision electronic sensing of the rotational position of the filter. The electronic signal provides accuracy to a fraction of a minute of arc.

We claim:

1. An improved laser tuning apparatus including a plurality of parallel, spaced-apart birefringent plates rotatably mounted within the optical cavity of a tunable laser, the improvement comprising:
means for independently adjusting the orientations of the individual plates, comprising:
a plate holder for each plate and
a screw drive for orienting each plate and holder by rotating them about an axis, and
clamping means for demountably securing the positions of the individual plates, without substantially altering their orientations, by exerting on the plate holder a force that is directed substantially parallel to the axis, and
means for rotating the plurality of plates as a unit to tune the laser.

2. An improved laser tuning apparatus including a plurality of parallel, spaced-apart birefringent plates rotatably mounted within the optical cavity of a tunable laser, the improvement comprising:
means for independently adjusting the orientations of the individual plates,
clamping means for demountably securing the positions of the individual plates without substantially altering the orientations,
means for rotating the plurality of plates as a unit to tune the laser,
means for sensing the rotational position of the plurality of plates, and
motorized drive means to rotate the plurality of plates to a desired predetermined position.

3. The tuning apparatus of claim 2 further comprising feedback means for controlling the drive means in response to a signal from the sensing means.

* * * * *